United States Patent

[11] 3,601,335

[72] Inventors Charles W. Dopkins
Cottage Grove;
Richard Alan DeVries, New Brighton, both of, Minn.
[21] Appl. No. 7,530
[22] Filed Feb. 2, 1970
[45] Patented Aug. 24, 1971
[73] Assignee Minnesota Mining and Manufacturing Company
St. Paul, Minn.

[54] FILM CARTRIDGE
9 Claims, 8 Drawing Figs.

[52] U.S. Cl. ................................................ 242/199, 352/72
[51] Int. Cl. .................................................... G03b 1/04, G11b 15/32, G11b 23/04
[50] Field of Search ......................................... 242/200, 197, 71.2; 352/78, 72; 95/19

[56] References Cited
UNITED STATES PATENTS
| | | | |
|---|---|---|---|
| 3,075,717 | 1/1963 | Kingston | 242/200 |
| 3,373,950 | 3/1968 | Greenberg | 242/200 |
| 3,512,734 | 5/1970 | Priest | 242/197 |
| 3,529,788 | 9/1970 | Sasaki et al. | 242/199 |

Primary Examiner—Leonard D. Christian
Attorney—Kinney, Alexander, Sell, Steldt and Delahunt ABSTRACT: A film cartridge in which the rotation of spools on which supply and takeup rolls of film in the cartridge are wound is restrained to cause controlled, uniform advancement of the film and to maintain compact supply and takeup rolls. In one embodiment, a central spindle of the spools is rotatably mounted within a hub that comprises spring fingers arranged as a segmented cylindrical bearing. The spindle is larger in diameter than the bore through the segmented cylindrical bearing, so that the spindle slightly displaces the spring fingers from their normal position. As a result, the spring fingers exert a pressure on the spindle that restrains rotation of the spool. In a preferred embodiment, supply and takeup rolls of film are reliably attached to the spools by placing an aperture in the ends of the film over a tab on the spools' film-winding surface that has a dimension in the film-winding plane that is larger than the aperture.

PATENTED AUG 24 1971
3,601,335
SHEET 1 OF 2
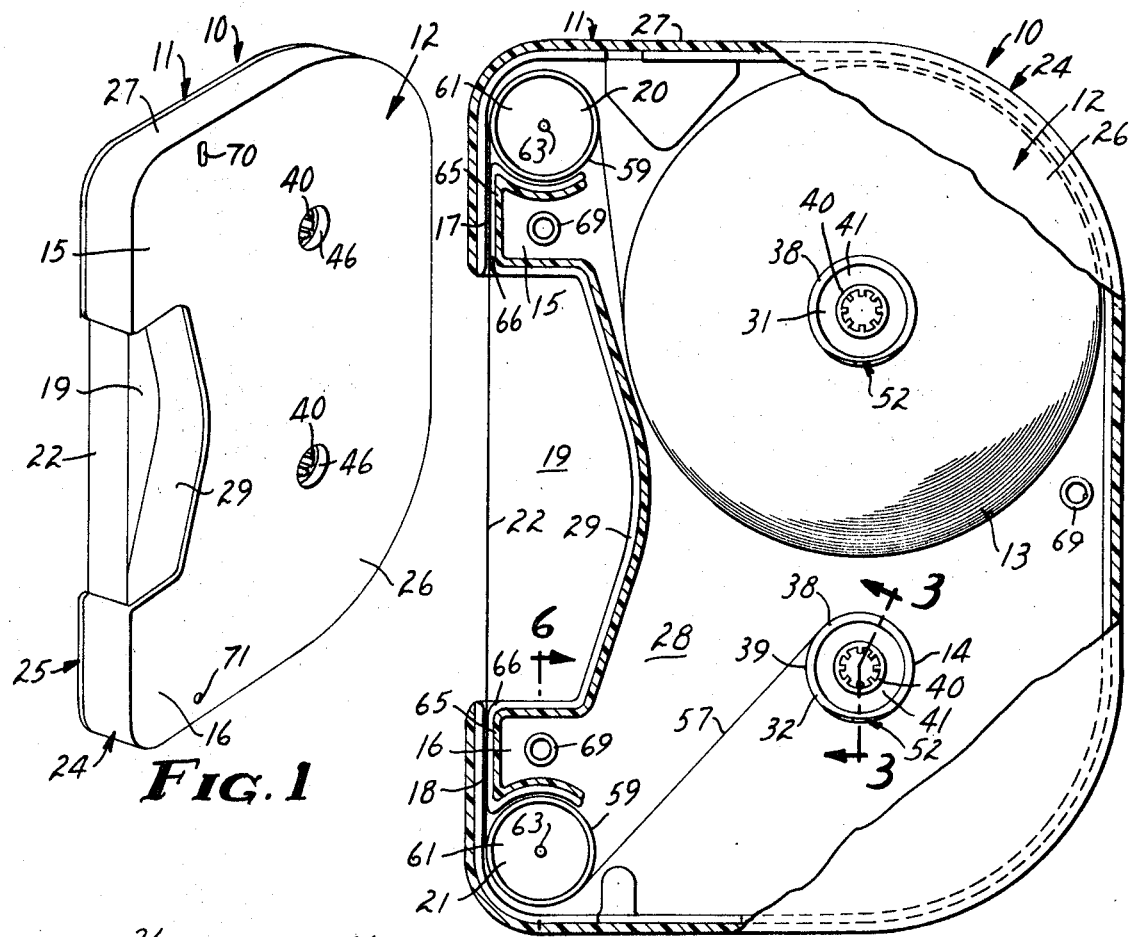
FIG. 1
FIG. 2
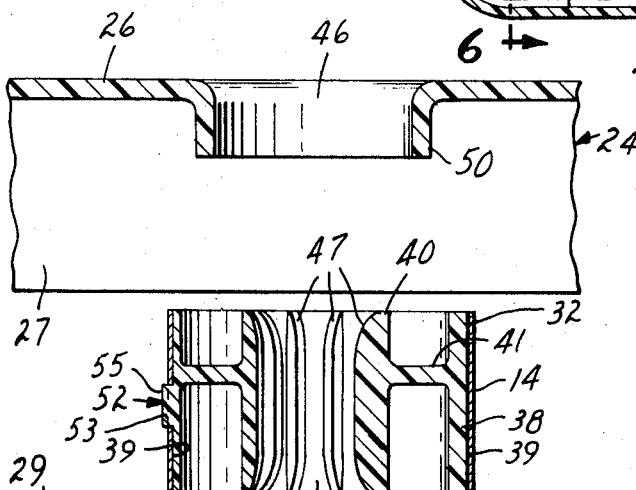
FIG. 3
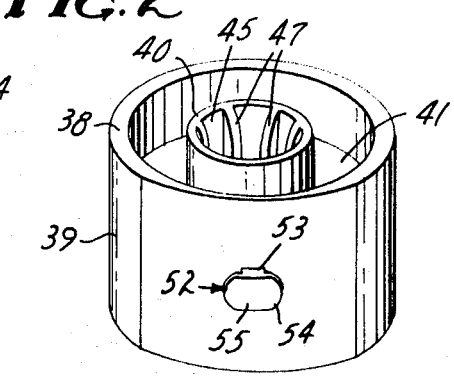
FIG. 4
INVENTORS
CHARLES W. DOPKINS
R. ALAN DeVRIES
BY Kinney, Alexander,
Sell, Steldt & DeLa Hunt
ATTORNEYS

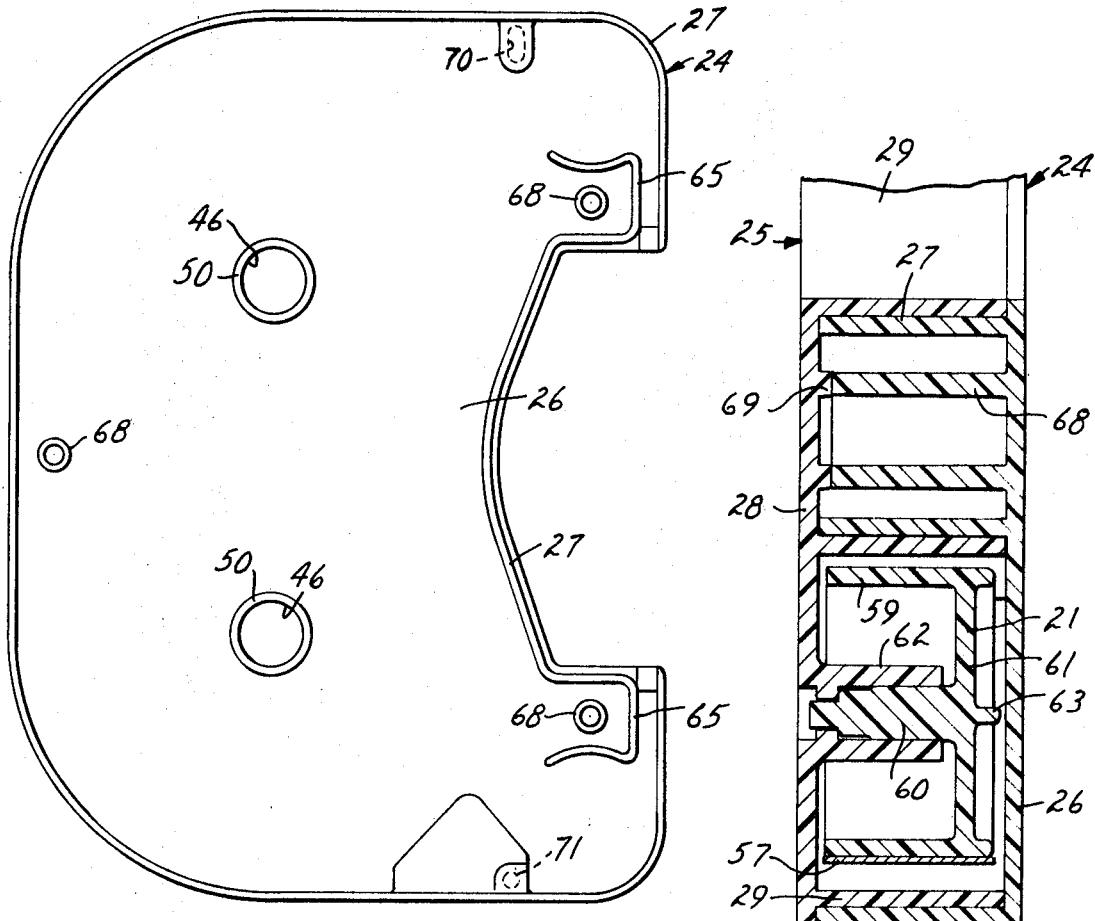
FIG. 5
FIG. 6
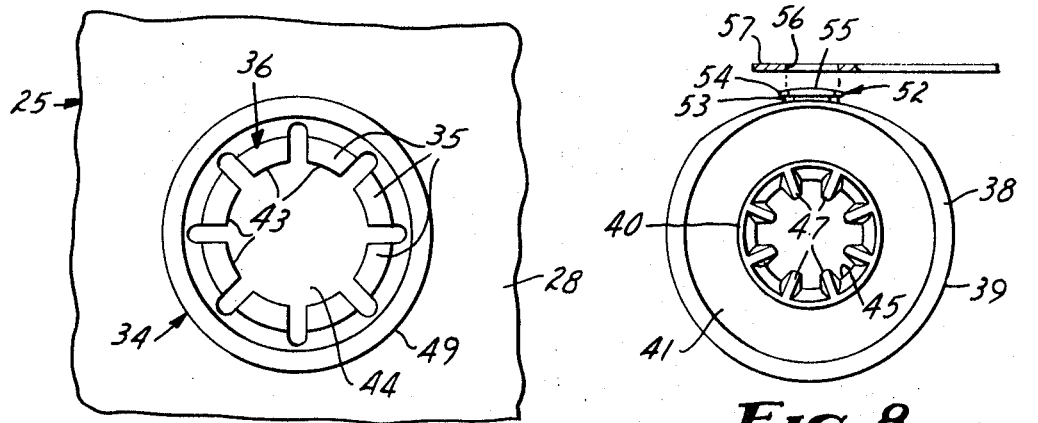
FIG. 7
FIG. 8
INVENTORS
CHARLES W. DOPKINS
R. ALAN DEVRIES
BY Kinney, Alexander,
Sell, Steldt & DeLaHunt
ATTORNEYS 3,601,335

FILM CARTRIDGE

The intermittent advancement of an unexposed frame of film in a camera into position for exposure should be a controlled, uniform, and reliable movement. Thus, the film between the supply and takeup rolls should never become so slack in the interval between the intermittent movements that it undergoes a jerk or snap when the next movement suddenly takes up the slack. Such a jerking of film sometimes causes incomplete advancement, or spilling of an excessive amount of film from the supply roll which can lead to entanglement of the film, or subjection of the film to undesirably high stresses.

The present invention provides a film cartridge that stores film in compact supply and takeup rolls and that cooperates with film-advancing apparatus in a camera so that the film is advanced from the supply roll to the takeup roll in controlled, uniform amounts. At the same time, the design of a cartridge of the invention permits it to be inexpensively molded from plastic. A cartridge of the invention is sufficiently inexpensive despite provision of the described controlled handling of film, that it may be discarded after a single use.

A film cartridge of the invention comprises molded plastic parts that mate together to form a lighttight compartment having two parallel large area sidewalls and edgewalls and enclosing the supply and takeup rolls of film. Film extends from the supply roll through a passageway to the exterior of the camera and then through a passageway to the takeup roll, and the length of film exterior to the cartridge is adapted for engagement by film-advancing and film-exposing apparatus in a camera.

Supply and takeup spools for storing the supply and takeup rolls of film are rotatively mounted within the lighttight compartment on hubs that extend from a sidewall of the compartment. The spools each comprise a cylinder that provides a film-winding surface, a spindle coaxial with the cylinder, and means connecting the cylinder and the spindle. Either the hub on which the spools are mounted or the spindle of the spools comprises a set of spring fingers that extend generally perpendicular to the large area sidewalls of the lighttight compartment and are located equidistant around a central axis so as to form a segmented cylindrical bearing. The other of the hub and spindle mates with the segmented cylindrical bearing in such a manner that the spring fingers are displaced from their normal position to develop a spring pressure acting on the other of the hub and spindle and thereby restraining rotation of the spools. This restraint of rotation prevents the film from prematurely unwinding from the supply and takeup rolls, and assures a controlled, uniform advancement of film from the supply roll to the takeup roll under the action of film-advancing apparatus within a camera.

In addition, in preferred embodiments of the invention, the spools are provided with means for conveniently and reliably attaching film to the spools. This attaching means includes a tab extending radially from the film-winding surface of each spool in an area where the winding surface is depressed so that the radially outermost surface of the tab is substantially coincident with the cylindrical plane defined by the film-winding surface. The tab comprises a radially extending stub post and an enlarged head attached to the post. The end of film to be attached to the spool is apertured, and the enlarged head of the tab has a dimension in the plane of film wound on the spool that is larger than the aperture. As a result, film must be distorted to engage the film on the tab, and the resulting snug hold of the film on the spool further contributes to maintenance of compact supply and takeup rolls of film.

DESCRIPTION OF THE DRAWINGS

FIG. 1 is a perspective view of an illustrative film cartridge of this invention;

FIG. 2 is a plan view of the cartridge shown in FIG. 1, with the top sidewall in the figure being partially broken away to reveal the inner structure of the cartridge;

FIG. 3 is a section along the lines 3—3 of FIG. 2 with the parts shown exploded out of their assembled position;

FIG. 4 is a perspective view of a spool used in the illustrated cartridge;

FIG. 5 is an elevation of the inside of the cartridge section shown in part in FIG. 2;

FIG. 6 is a section view along the lines 6—6 in FIG. 2;

FIG. 7 is a detail view along the lines 7—7 in FIG. 3; and
DESCRIPTION

FIG. 8 is a top view of the spool shown in FIG. 4.

DETAILED DESCRIPTION

As shown in FIGS. 1 and 2, an illustrative cartridge 10 of this invention has an exterior case 11 that includes a main body portion 12 in which a supply roll 13 and a takeup roll 14 of film are enclosed and also includes two parallel separated arms 15 and 16 that project forwardly from the main body portion. The forwardly projecting arms each include a straight line film passageway 17 and 18 near the forward end of the arms transverse to the direction of projection of the arms. The passageways 17 and 18 open on the space 19 between the arms and are lineally aligned with one another so as to define a straight line film path parallel to a line connecting the axes of the supply and takeup rolls of film. Idler rollers 20 and 21 are positioned in the arms 15 and 16, respectively, at the inside of the passageways 17 and 18 and tangential to the straight line film path. Film travels from the supply roll 13 around the idler roller 20, then along the straight line film path through the space 19 between the arms, and then around the idler roller 21 back to the takeup roll 14. The illustrated arrangement of supply and takeup rolls, idler rolls, and film path further contributes to controlled advancement of film. The space 19 between the two forwardly projecting arms 15 and 16 is rather large so as to provide ample space for exposure apparatus and film-advancing apparatus in a camera to be positioned around film 22 traveling in the space.

The exterior case 11 of the illustrative cartridge includes two mating sections 24 and 25 molded from plastic. The case section 24, which is the top section in FIG. 2, includes a large area sidewall 26 and an edgewall 27 extending perpendicularly to the large area sidewall 26 around the circumference of the sidewall. The case section 25, which is the bottom section of FIG. 2, similarly includes a large area sidewall 28 and an edgewall 29 that extends perpendicularly from the large area sidewall 28 around the circumference of the sidewall. The edgewalls 27 and 29 from the cartridge sections extend nearly to the large area sidewall of the other cartridge section when the two sections are assembled as a complete cartridge case, and this overlapping of the edgewalls forms a lighttight baffle arrangement.

The supply and takeup rolls of film, 13 and 14, are wound on spools 31 and 32 that are rotatably mounted on hubs 33 (not shown) and 34 extending from the sidewall 28 of the bottom cartridge section 25. Each of the hubs 33 and 34 include a set of spring fingers 35, as shown in FIGS. 3 and 7, molded integrally with the sidewall 28 and extending perpendicularly to the sidewall as a segmented cylindrical bearing 36. As shown in FIGS. 3, 4, and 8 the spools each include cylinder 38 providing a film-winding surface 39, a central spindle 40, and a flange 41 connecting the cylinder 38 and the spindle 40. The spindle 40 of each spool is inserted within the segmented cylindrical bearing 36 of its hub, and the spindle has a diameter sufficient to displace the spring fingers 35 outwardly so that the spring fingers exert a pressure against the spindle. The spring fingers 35 are generally vertical members, and the ends of the spring fingers have inwardly extending pads 43 that actually engage the spindle 40. Spring fingers of this design are conveniently molded integrally with the rest of the cartridge section. The frictional force provided by the spring fingers on the spindle 40 restrains the rotational movement of the spool.

The sidewall 28 of the bottom cartridge section 25 is formed with openings 44 that are aligned with a central axial bore 45 in the spindle 40 of the spools 31 and 32, so that a spool-drive-pin may extend from a camera into the bore of each of the spools. In addition, the sidewall 26 of the cartridge section 24 is provided with openings 46 that are aligned with the bore in the spindle 40 of the spools so that the spool-drive-pin can extend into the bore of the spools from either direction. Thus, the cartridge is adapted to be used with film that is initially exposed on only one-half of its width, and after transfer of the film from a supply roll to a takeup roll, the cartridge is flipped over and reinserted in the camera with the original takeup roll becoming the supply roll. The bore 45 in the spindles is provided with radially and axially extending short flanges 47 that provide means by which the spool-drive-pin can drivingly engage the spools.

A solid cylindrical wall 49 surrounding the spring fingers 35 is integrally molded with the sidewall 28 and mates within an annular recess between the spindle 40 and cylinder 38, preventing light entering through the openings in the sidewall from reaching film in the cartridge. Similarly, a short cylindrical wall 50 extends inwardly from the sidewall 26 of the cartridge section 24 and registers within an annular recess at the top of each of the spools. The two walls 49 and 50 together with the cylinder 38 of the spools form a lighttight baffle arrangement.

In some embodiments of the invention the hubs 33 and 34 are formed as solid cylindrical walls and the spindle 40 of the spools 31 and 32 is formed as a segmented cylindrical bearing that frictionally engages the hub wall; generally, in these embodiments, the spindle engages within the hub wall so as to permit engagement of a spool-drive-pin within the bore of the spindle. Further, although the spindle of the spools in the illustrated cartridge is a separate member within an outer cylindrical wall that serves as the cylinder providing the film-winding surface, in other embodiments of the invention, the spindle is simply an extension of a cylinder.

As shown in FIGS. 4 and 8 the spools in the preferred cartridge illustrated in the drawings are provided with a radially extending tab 52 on their exterior film-winding surface 39 by which film is attached to them. The tab 52 comprises a stub post 53 that extends radially from the spool and an enlarged generally oval-shaped head 54 attached to the stub post. The tab 52 is attached to the spool at a point where the film-winding surface is depressed, and the radially outermost surface 55 of the head 54 is curved so as to lie substantially in the same cylindrical plane as the film-winding surface 39 of the spool. An aperture 56 is provided in the end of film 57 to be wound on the spool, and the diameter of the aperture is smaller than the length of the oval-shaped head 54 of the tab and also smaller than the distance between one end of the oval-shaped head and the opposite side of the post 53. Thus the end of the film must be distorted and stretched somewhat to get the film over the head, and when the film is attached over the head it is snugly held on the spool. Since the radially outermost surface of the head 54 lies substantially in the same plane as the film-winding surface of the spool, film wrapped on the spool is subjected to substantially no distortion, with only the first winding or two sometimes showing a slight mark formed by the edges of the head 54.

As shown in FIG. 6, the idler rolls 20 and 21 include an outer cylindrical wall 59, a central spindle 60, and a flange 61 connecting the outer wall to the spindle. The spindle 60 fits rotatably and slidably within a sleeve 62 that extends outwardly from the sidewall 28 of the cartridge section 25 and is integrally molded with the cartridge section 25. A protrusion 63 has a height greater than the height of the cylindrical wall 59, so only the protrusion ever abuts the inside surface of the sidewall 26. The nearly pin point engagement between the protrusion 63 and sidewall 26 assures that there will be a minimal drag on the roller and little opportunity for the roller to bind. Extensions 65 and 66 of the edgewalls 27 and 29 of the cartridge sections 24 and 25 are configured to define one side of the film passageways 17 and 18 in the cartridge and to provide a wall bordering the idler rollers, and these extensions contribute to the light baffle in the cartridge.

The cartridge section 24 is provided with upstanding posts 68 that mate with raised areas 69 on the inside of the cartridge section 25; the posts and raised areas are welded together as by sonic welding to attach the two cartridge sections together. The cartridge is also provided with recesses 70 and 71 as shown in FIG. 1, which are received on locator pins that extend from the camera. The locator pins fix the cartridge along a line parallel and adjacent to the straight line film path of the film length 22, and thus further assure controlled, uniform advancement of film within the cartridge.

What we claim is:

1. A film cartridge in which film is stored in compact supply and takeup rolls and advanced from the supply roll to the takeup roll in uniform controlled intermittent movements, the cartridge comprising:
    a. molded plastic parts that mate together to provide a lighttight compartment having two parallel large area sidewalls and edgewalls enclosing supply and takeup rolls of film,
    b. supply and takeup spools on which the supply and takeup rolls of film are wound, each spool comprising a cylinder providing a film-winding surface, a spindle coaxial with the cylinder, and means connecting the cylinder to the spindle, and
    c. supply and takeup hubs for rotatively mounting the supply and takeup spools, the hubs extending from a sidewall of the lighttight compartment on generally parallel spaced axes,
    either the hub or spindle comprising a set of spring fingers extending generally perpendicularly to the sidewalls of the lighttight compartment and located equidistant around a central axis so as to form a segmented cylindrical bearing, and the other of the hub and spindle mating with the segmented cylindrical bearing so as to displace the spring fingers from their normal position to develop a spring pressure acting on the other of the hub and spindle to restrain rotation of the spools.

2. A film cartridge of claim 1 in which (a) the lighttight compartment includes a main body portion in which the supply and takeup rolls are stored and two parallel separated arms that project forwardly from the main body portion, each arm having a straight line film passage that opens on the space between the arms and is lineally aligned with the other passage, and (b) an idler roller is positioned within each arm at the inside end of the passage and tangential to the passage, whereby film in the cartridge travels from the supply roll around an idler roller in one forwardly projecting arm, then along the straight line film path through the space between the forwardly projecting arms, and then around an idler roller in the second forwardly projecting arm to the takeup roll.

3. A cartridge of claim 1 in which the hub is the segmented cylindrical bearing and the spindle on the spool fits within the segmented cylindrical bearing.

4. A cartridge of claim 1 in which the film in the cartridge is attached to at least one of the supply and takeup spools by location of an aperture in the film on a tab on the spool, the tab comprising a radially extending stub post joined to the film-winding surface of the spool carrying an enlarged head having a dimension in the plane of film wound on the spool larger than the diameter of the aperture in the film, the film-winding surface of the spool being depressed in the area of the tab whereby the radially outermost surface of the enlarged head is substantially coincident with the cylindrical plane defined by the spool's film-winding surface.

5. A cartridge of claim 1 in which the spindle of at least the takeup spool has a central bore and at least one of the parallel large area sidewalls of the lighttight compartment has an opening aligned with the bore in the spindle, whereby a spool-drive-pin in a camera may be drivingly engaged within the spool.

6. A cartridge of claim 5 in which the spindle in both the supply and takeup spools has a central bore, and both the parallel large area sidewalls of the lighttight compartment have openings aligned with the bore in the spindles, whereby a spool-drive-pin may be drivingly engaged within either of the spools from either side of the cartridge.

7. In a film cartridge comprising mating molded plastic parts that form
   1. an exterior case having two parallel large area sidewalls and edgewalls forming a lighttight compartment that includes a main body portion and two parallel separated arms that project forwardly from the main body portion, each arm having a straight line film passage that opens on the space between the arms and is lineally aligned with the other passage,
   2. supply and takeup spools rotatably mounted within the main body portion and adapted to hold supply and takeup rolls of film, and
   3. two idler rollers, one positioned within each forwardly projecting arm at the inside end of the passage and tangential to the passage, whereby film in the cartridge travels from the supply roll around an idler roller in one forwardly projecting arm, then along the straight line film path through the space between the forwardly projecting arms, and then around an idler roll in the second forwardly projecting arm to the takeup roller, improved spool and spool mounting means comprising
   1. supply and takeup spools that include a cylinder providing a film-winding surface, a spindle coaxial with the cylinder, and means connecting the cylinder and the spindle, and
   2. supply and takeup hubs for rotatively mounting the supply and takeup spools, the hubs extending from one sidewall on generally parallel spaced axes, either the hub or spindle comprising a set of spring fingers extending generally perpendicularly to the sidewalls of the lighttight compartment and located equidistant around a central axis so as to form a segmented cylindrical bearing, and the other of the hub and spindle mating with the segmented cylindrical bearing so as to displace the spring fingers from their normal position to develop a spring pressure acting on the other of the hub and central spindle to restrain rotation of the spools.

8. A cartridge of claim 7 in which the hub is the segmented cylindrical bearing and the spindle on the spool fits within the segmented cylindrical bearing.

9. A cartridge of claim 7 in which the film in the cartridge is attached to at least one of the supply and takeup spools by location of an aperture in the film on a tab on the spool, the tab comprising a radially extending stub post joined to the film-winding surface of the spool and carrying an enlarged head having a dimension in the plane of film wound on the spool larger than the diameter of the aperture in the film, the film-winding surface of the spool being depressed in the area of the tab whereby the radially outermost surface of the enlarged head is substantially coincident with the cylindrical plane defined by the spool's film-winding surface.